Patented Dec. 4, 1923.

1,476,001

UNITED STATES PATENT OFFICE.

ARTHUR MARSHALL McINTOSH, OF SYDNEY, AUSTRALIA.

INVESTMENT MATERIAL.

No Drawing. Application filed July 15, 1922. Serial No. 575,386.

*To all whom it may concern:*

Be it known that I, ARTHUR MARSHALL McINTOSH, a citizen of the Commonwealth of Australia, and a resident of Sydney, Australia, have invented a certain new and useful Investment Material, of which the following is a specification.

My invention consists in an investment material to be used for making moulds in all cases where the article to be produced must be subject to intense heat for the purposes of fusing, and accuracy of shape and fit is essential, and particularly, where it is required that a separate and distinct mould be employed in each individual case. The investment material is of particular value in the moulding of porcelain and other ceramic ware for dental and other purposes. It may also be used in the moulding of glass and other materials which may be shaped in a fused condition.

My investment material which is to be known as "pyroplastic" consists of a mixture of silica, and a bonding material such as alumina or alumina bearing clay. Both ingredients are mingled in a pulverized condition. The silica particles may be of such size as would permit of their passing through a sixty mesh sieve or screen, and the alumina particles should be ground as finely as possible. It is not intended, however, that the particles of the ingredients shall always be of the exact dimensions suggested, as any reasonable variation in size is permissible and would not detract from the value and efficiency of the investment material. The proportions of each ingredient must be such that when the mass is subjected to heat the contraction of the alumina or alumina bearing material is compensated by the expansion of the silica particle.

The entire mass, when subjected to intense heat, experiences no appreciable change in its size. In other words, my investment material will not contract or expand and thus alter the size of the mould and impair the accuracy of the article being formed to any appreciable degree.

The proportions of the ingredients are not susceptible of precise definition, since all clays have an alumina content in varying degree and differ from one another in their chemical and physical properties. The proportions are ascertained, and can be ascertained by any one skilled in the art, by simple experiments upon the respective ingredients employed.

In my investment material, the clay or alumina bearing ingredient is mixed with the silica only in such proportions as are necessary to give cohesion to the mass. In other words, an alumina content effective as a bonding material is sufficient to compensate the expansion of the silica particles during the application of intense heat.

Investment materials heretofore employed for the purposes of dentistry have usually been composed of silica and plaster of Paris. This composition is deficient in porosity, and does not readily absorb water. If it is attempted to dry the water out rapidly the material is liable to explode. The thermal resistance is low, and when subjected to relatively moderate heat it becomes extremely fragile, and there is always a tendency to lose its original form. Such investment materials are therefore poorly adapted to dental and other purposes where precision and accuracy are imperative.

My investment material has considerable porosity; its thermal resistance is high, and it will not alter its size or shape by contraction or expansion under heat.

The advantages resulting from these physical properties are that it will readily absorb water, and may be rapidly dried without danger of explosion. Its high thermal resistance enables it to gain strength, and endure greater pressure when subjected to intense heat, as is necessary when articles are being fused in moulds in which it is employed. The fact that it will not change its shape or size under the application of intense heat insures accuracy of fit in the article being moulded and fused.

A further use to which my investment material may be put and purpose for which it is intended is to hold pieces of metal during the process of soldering as is now done by means of cuttle-fish in the jewelry manufacturing industry and other arts. My investment material has advantages over cuttle-fish in that its original cost is less, it is more easily shaped to the form of a mould, and it can be repeatedly used.

For example, my investment material may be mixed with water and formed into die members between which porcelain or other ceramic substances may be shaped either at the fusing point or at such other temperatures as will induce pliability or plasticity in the substance. During this forming or shaping process, and when subject to considerable pressure at the temperatures indicated, the pyroplastic mould will retain its size and shape, and maintain its mechanical strength and cohesive properties. The particles of the investment material will not fuse together or to the porcelain ware during this process, and after being cooled the investment material may be readily broken away without injury to the ware.

The physical properties of my investment material consist in a high thermal resistance enabling it to withstand fusion at a temperature at which porcelain or ordinary ceramic ware will fuse and to retain its mechanical strength and cohesive properties, by reason of the fact that the contraction of the particles composing the bonding material is offset by the expansion of those of the silica. It is readily moulded when water is admixed, and the moisture may be rapidly removed without danger of explosion. And upon completion of the moulded article the investment material may be easily broken away without injury to the finished product, all of which assure a high degree of accuracy in the manufactured product and diminish the danger of injury to delicate or fragile ware.

The properties and value of my investment material may be explained and illustrated by describing one or two of the many processes in which it may be employed to effect important commercial results with a material saving of time and expense, and an increased accuracy in the finished product. It is of especial value in making porcelain inlays in the practice of dentistry.

For the making of such inlays, a wax model is prepared and embedded in my investment material. The wax is then burned out, whereupon a mold of the exact size of the wax model will be left. A thin layer of porcelain mixed with water is then painted over the interior and edges of the mold. The investment material mold with the porcelain therein is placed in a furnace and the porcelain is fused. The mold and porcelain are then slowly cooled, and the ceramic substance again applied so that the material is made to stand above the mould except at the edges, to allow for shrinkage. The porcelain is again fused and the process may be again repeated until the inlay is of the required size and shape.

In making dentures and more elaborate restorations I am likewise able to effect similar economies by the employment of my investment material.

The most generally approved and accepted practice has required the mounting of the teeth on a platinum plate by means of platinum pins. This is expensive, requires a high degree of skill and the results are uncertain.

Where my investment material is employed a model of the denture is made in the wax, and prepared porcelain teeth mounted on the wax model. The wax model with the teeth attached is then embedded in a body of my investment material, leaving one surface of the ware exposed. The investment material is painted with a parting material for which purpose my pyroplastic investment material may also be employed, and an upper mold or die member is made of the investment material to fit the exposed surface of the model.

The two die members made of the investment material are placed together and dried and then heated until the wax is burned out. Two die members are thus made forming a perfect model.

Porcelain mixed with water is placed in the mold members and is made to stand out beyond the deeper mold member. The mold members spaced apart slightly by reason of the projecting or built up portion of the porcelain are then placed in the furnace. The mold member, which holds the teeth that were first set in the wax model, forms an anchor for those teeth, holding them in proper position with relation to each other during the time the porcelain is being placed in the mold and until the porcelain is fused.

The furnace is heated until the porcelain fuses and thereafter the mold members may be forced together to give the porcelain the exact shape of the mold.

I claim as my invention:

1. An investment material having an ingredient which expands and alumina which contracts at high temperature, said ingredients being mixed in such proportions that the expansion of the one compensates for the contraction of the other so that there is no appreciable change in the volume of the mass.

2. An investment material consisting of silica and alumina particles in such proportions as will, upon the application of intense heat, insure that the expansion of the silica shall offset the contraction of the alumina so that there will be no appreciable change in the volume of the mass.

3. An investment material consisting of silica and alumina particles compounded in such proportions that the alumina shall act as a bonding material and the expansion of the silica upon the application of intense heat to the mass shall offset the contraction of the alumina, the whole retaining its original volume without appreciable change, having unusual porosity, high thermal resistance, and great mechanical strength, and enabling a mould formed out of the investment material to be readily removed after fusion of the article moulded.

Des Moines, Iowa, June 16, 1922.

ARTHUR MARSHALL McINTOSH.